United States Patent
Sato et al.

(10) Patent No.: US 12,339,622 B2
(45) Date of Patent: Jun. 24, 2025

(54) LIGHT IRRADIATING DEVICE AND SENSOR

(71) Applicant: FUJIFILM Corporation, Tokyo (JP)

(72) Inventors: Hiroshi Sato, Minamiashigara (JP); Katsumi Sasata, Minamiashigara (JP); Yukito Saitoh, Minamiashigara (JP)

(73) Assignee: FUJIFILM Corporation, Tokyo (JP)

( * ) Notice: Subject to any disclaimer, the term of this patent is extended or adjusted under 35 U.S.C. 154(b) by 752 days.

(21) Appl. No.: 17/508,426

(22) Filed: Oct. 22, 2021

(65) Prior Publication Data
US 2022/0043395 A1 Feb. 10, 2022

Related U.S. Application Data

(63) Continuation of application No. PCT/JP2020/017706, filed on Apr. 24, 2020.

(30) Foreign Application Priority Data

May 10, 2019 (JP) .................. 2019-090083

(51) Int. Cl.
| | | |
|---|---|---|
| *G02F 1/1343* | (2006.01) | |
| *G01B 11/25* | (2006.01) | |
| *G03H 1/22* | (2006.01) | |

(52) U.S. Cl.
CPC ......... *G03H 1/2294* (2013.01); *G01B 11/254* (2013.01); *G02F 1/134309* (2013.01);
(Continued)

(58) Field of Classification Search
CPC ........ G02B 6/00; G02B 6/005; G02B 6/0056; G02B 5/18; G02B 5/1814; G02B 5/1833;
(Continued)

(56) References Cited

U.S. PATENT DOCUMENTS

| | | |
|---|---|---|
| 10,386,558 B2 | 8/2019 | Escuti et al. |
| 2014/0082373 A1 | 4/2014 | Tabirian et al. |

(Continued)

FOREIGN PATENT DOCUMENTS

| | | |
|---|---|---|
| JP | 2013-20551 | 10/2013 |
| JP | 2018-519327 A | 6/2016 |

(Continued)

OTHER PUBLICATIONS

Japanese Notice of Reasons for Refusal for Japanese Application No. 2021-519347, dated Sep. 20, 2022, with an English translation.
International Preliminary Report on Patentability and English translation of the Written Opinion of the International Searching Authority for International Application No. PCT/JP2020/017706, dated Nov. 25, 2021.

(Continued)

*Primary Examiner* — Jie Lei
(74) *Attorney, Agent, or Firm* — Birch, Stewart, Kolasch & Birch, LLP (57) ABSTRACT

Provided is a small-sized light irradiating device having a simple configuration that projects an optical pattern. The light irradiating device includes a light source and a liquid crystal hologram element, in which the liquid crystal hologram element diffracts transmitted light in a plurality of different directions, the liquid crystal hologram element includes a liquid crystal hologram layer, the liquid crystal hologram layer is a layer that consists of a computer generated hologram and is formed of a composition including a liquid crystal compound, and the liquid crystal hologram layer further includes a plurality of regions in which directions of optical axes derived from the liquid crystal compound are different from each other.

16 Claims, 4 Drawing Sheets

(52) U.S. Cl.
CPC ....... *G03H 1/2205* (2013.01); *G03H 2223/17* (2013.01); *G03H 2223/22* (2013.01); *G03H 2223/23* (2013.01); *G03H 2225/36* (2013.01); *G03H 2225/60* (2013.01)

(58) Field of Classification Search
CPC .......... G02B 5/3016; G02B 5/32; G02B 5/30; G02B 5/3083; G02B 27/286; G02B 27/4205; G02F 1/1343; G02F 1/134309; G02F 1/1337; G02F 1/13363; G02F 1/133528; G01B 11/25; G01B 11/254; G01B 11/2513; G03H 1/22; G03H 1/2205; G03H 1/2294; G03H 1/0256; G03H 2223/17; G03H 2223/22; G03H 2223/23; G03H 2225/36; G03H 2225/60; G03H 2240/15; G03H 2250/38; G03H 2250/41
USPC ....... 359/3, 11, 15, 443, 494, 457, 558, 563, 359/566
See application file for complete search history.

(56) References Cited

U.S. PATENT DOCUMENTS

| | | |
|---|---|---|
| 2014/0376092 A1 | 12/2014 | Mor |
| 2016/0011353 A1* | 1/2016 | Escuti ..................... G02B 5/32 359/15 |
| 2017/0336543 A1 | 11/2017 | Spring et al. |
| 2017/0373459 A1 | 12/2017 | Weng et al. |
| 2020/0063938 A1 | 2/2020 | Kurashige et al. |

FOREIGN PATENT DOCUMENTS

| | | |
|---|---|---|
| JP | 2018-500589 A | 1/2018 |
| WO | WO2018/092834 A1 | 5/2018 |

OTHER PUBLICATIONS

International Search Report for International Application No. PCT/JP2020/017706, dated Jul. 21, 2020, with English translation.

* cited by examiner

LIGHT IRRADIATING DEVICE AND SENSOR

CROSS-REFERENCE TO RELATED APPLICATIONS

This application is a Continuation of PCT International Application No. PCT/JP2020/017706 filed on Apr. 24, 2020, which claims priority under 35 U.S.C. § 119(a) to Japanese Patent Application No. 2019-090083 filed on May 10, 2019. Each of the above applications is hereby expressly incorporated by reference, in its entirety, into the present application.

BACKGROUND OF THE INVENTION

1. Field of the Invention

The present invention relates to a light irradiating device that projects an optical pattern and a sensor including the light irradiating device.

2. Description of the Related Art

The projection of the optical pattern such as a dot pattern is widely used as in three-dimensional (3D) optical mapping.

For example, in a mobile electronic apparatus such as a smartphone, the face of a user is authenticated by the projection of the dot pattern. Specifically, a dot pattern emitted from a plurality of point light sources is projected to the face of the user, and reflected light from the face is received by a light-receiving element. An optical image obtained by the light-receiving element receiving the reflected light is processed and is compared to the projected dot pattern. As a result, the face of the user is authenticated.

In a sensor that projects the dot pattern, a small-sized light irradiating device is used in order to project a dot pattern to an object as an object to be detected.

In the light irradiating device, for example, as described in US2014/0376092A, light emitted from light sources including a plurality of light-emitting elements in a plane is distributed by a lens in different directions to form a dot pattern. In addition, by duplicating the formed dot pattern in different directions with a diffractive optical element, the dot pattern is projected in a wide range.

US2014/0376092A describes an example in which, in order to reduce the size of the light irradiating device, a vertical-cavity surface-emitting laser (VCSEL) including a plurality of light-emitting elements is used as a light source.

However, in a mobile electronic apparatus such as a smartphone, further reduction in thickness is desired.

In order to solve this problem, an optical light guide element described in JP2018-500589A is known. In the optical light guide element described in JP2018-500589A, by reflecting incident light from a first reflecting surface disposed at an angle of about 45° with respect to a light incidence direction, a light traveling direction is changed to a direction perpendicular to the incidence direction. Further, by reflecting light from a second reflecting surface disposed parallel to the first reflecting surface, the light is output from the optical light guide element. In the optical light guide element described in JP2018-500589A, by changing an optical path as described above, the optical path length is secured, and the thickness of the device is reduced.

SUMMARY OF THE INVENTION

This way, in a light irradiating device in the related art, in order to reduce the thickness of the device, for example, it is necessary to use a light guide in which two members having a reflecting surface are disposed parallel to each other such that an angle between the reflecting surfaces is about 45°. Therefore, the configuration of the device becomes complicated, and it cannot be said that reduction in thickness is sufficient.

In addition, in a small-sized light irradiating device in the related art, the thickness of a lens that distributes light in different directions is large, which is one cause interrupting the reduction in thickness.

An object of the present invention is to solve the above-described problem of the related art and to provide: a thin light irradiating device having a simple configuration that projects an optical pattern such as a dot pattern; and a sensor including the light irradiating device.

In order to achieve the object, an optical element according to an aspect of the present invention has the following configurations.

[1] A light irradiating device comprising
a light source; and
a liquid crystal hologram element,
in which the liquid crystal hologram element diffracts transmitted light in a plurality of different directions,
the liquid crystal hologram element includes a liquid crystal hologram layer,
the liquid crystal hologram layer is a layer that consists of a computer generated hologram and is formed of a composition including a liquid crystal compound, and
the liquid crystal hologram layer includes a plurality of regions in which directions of optical axes derived from the liquid crystal compound are different from each other.

[2] The light irradiating device according to [1],
in which a size of the region is 50 µm or less.

[3] The light irradiating device according to [1] or [2],
in which the light source emits light having a spread angle of 5° or less.

[4] The light irradiating device according to any one of [1] to [3],
in which a polarization switching element is provided between the light source and the liquid crystal hologram element and switches a polarization state of light to be transmitted.

[5] The light irradiating device according to [4],
in which the light source emits unpolarized light, and
a polarizer is provided between the light source and the polarization switching element or the light source emits linearly polarized light.

[6] The light irradiating device according to any one of [1] to [3], further comprising
a polarization switching element that switches polarized light to be transmitted and is provided downstream of the liquid crystal hologram element in a light traveling direction.

[7] The light irradiating device according to any one of [4] to [6],
in which the polarization switching element includes a liquid crystal cell including two substrates that include an electrode and a liquid crystal layer that is sealed between the substrates.

[8] The light irradiating device according to any one of [1] to [7], further comprising
a lens element that collects light emitted from the light source.

[9] The light irradiating device according to any one of [1] to [8], further comprising a diffractive optical element that is provided downstream of the liquid crystal hologram element in a light traveling direction.

[10] A light irradiating device comprising:
a plurality of the light irradiating devices according to any one of [1] to [9].

[11] A sensor comprising:
the light irradiating device according to any one of [1] to [10]; and
a light-receiving element.

The light irradiating device according to an aspect of the present invention is a thin light irradiating device having a simple configuration that projects an optical pattern such as a dot pattern. In addition, the sensor according to an aspect of the present invention including the light irradiating device is thin and has a simple device configuration.

DESCRIPTION OF THE PREFERRED EMBODIMENTS

Hereinafter, a light irradiating device and a sensor according to an embodiment of the present invention will be described in detail based on a preferable embodiment shown in the accompanying drawings.

In the present specification, numerical ranges represented by "to" include numerical values before and after "to" as lower limit values and upper limit values.

In the present specification, "(meth)acrylate" represents "either or both of acrylate and methacrylate".

In the present specification, the meaning of "the same" includes a case where an error range is generally allowable in the technical field. In addition, in the present specification, the meaning of "all", "entire", or "entire surface" includes not only 100% but also a case where an error range is generally allowable in the technical field, for example, 99% or more, 95% or more, or 90% or more.

In the present specification, visible light refers to light which can be observed by human eyes among electromagnetic waves and refers to light in a wavelength range of 380 to 780 nm. Invisible light refers to light in a wavelength range of shorter than 380 nm or longer than 780 nm.

In addition, although not limited thereto, in visible light, an ultraviolet ray (ultraviolet light) refers to light in a wavelength range of 200 nm or longer and shorter than 380 nm, and an infrared ray (infrared light) refers to light in a wavelength range of longer than 780 nm and 12000 nm or shorter.

In the present specification, $Re(\lambda)$ represents an in-plane retardation at a wavelength $\lambda$. Unless specified otherwise, the wavelength $\lambda$ refers to 550 nm.

In the present specification, $Re(\lambda)$ is a value measured at the wavelength $\lambda$ using AxoScan (manufactured by Axometrics, Inc.). By inputting an average refractive index $((nx+ny+nz)/3)$ and a thickness $(d (\lambda m))$ to AxoScan, the following expressions can be calculated.

Slow Axis Direction (°)
$Re(\lambda)=R0(\lambda)$
$R0(\lambda)$ is expressed as a numerical value calculated by AxoScan and represents $Re(\lambda)$.

Figure 1:
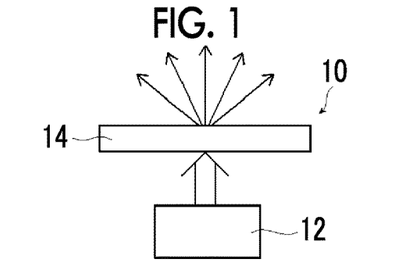
FIG. 1 is a diagram conceptually showing an example of a light irradiating device according to the present invention.

FIG. 1 is a diagram conceptually showing an example of the light irradiating device according to the embodiment of the present invention.

A light irradiating device 10 shown in FIG. 1 includes a light source 12 and a liquid crystal hologram element 14.

The liquid crystal hologram element 14 consists of a computer generated hologram and diffracts transmitted light incident into the light source 12 in a plurality of different directions.

In the light irradiating device 10 according to the embodiment of the present invention, as shown in FIG. 1, light emitted from the light source 12 transmits through the liquid crystal hologram element 14 such that the liquid crystal hologram element 14 diffracts the transmitted light in a plurality of different directions. The plurality of light components that travel in the different directions are emitted to an object such that a dot pattern is projected to the object.

(Light Source)

In the light irradiating device 10 according to the embodiment of the present invention, the light source 12 is not particularly limited, and various well-known light sources can be used. Examples of the light sources include an electric lamp such as a mercury lamp, a fluorescent lamp, a halogen lamp, a light emitting diode (LED), a laser such as a semiconductor laser, and a vertical-cavity surface-emitting laser (VCSEL).

The wavelength of light emitted from the light source 12 is not particularly limited and may be visible light or invisible light such as infrared light or ultraviolet light. In a case where light emitted from the light source 12 is visible light, the emitted light may be white light, red light, green light, or blue light. In particular, the infrared light as the invisible light is suitably used as the light emitted from the light source 12.

Further, the light emitted from the light source 12 may be unpolarized light or polarized light.

Here, in the light irradiating device 10 according to the embodiment of the present invention, it is preferable that the light source 12 emits light having high directivity. Specifically, it is preferable that the light source 12 emits light having a spread angle (beam spread angle) of 5° or less, it is more preferable that the light source 12 emits light having a spread angle of 3° or less, and it is still more preferable that the light source 12 emits light having a spread angle of 1° or less, and it is still more preferable that the light source 12 emits parallel light (collimated light).

The light spread angle is an angle (full width at half maximum angle) where a radiation intensity of light emitted from the light source changes from a radiation intensity maximum value to a value half of the maximum value.

The dot pattern that is formed by light transmitting through the liquid crystal hologram element 14 becomes more clear (sharp) as the directivity of the light emitted from the light source 12 increases. In particular, by adjusting the spread angle of the light emitted from the light source 12 to be 5° or less, a clear dot pattern is obtained.

In consideration of this point, for example, a LED or a laser is suitably used as the light source 12.

In a case where the directivity of the light emitted from the light source 12 is low, a lens element that collects the light emitted from the light source 12 to improve the directivity of the light may be disposed between the light source 12 and the liquid crystal hologram element 14. It is preferable that the spread angle of light incident into the liquid crystal hologram element 14 is adjusted to be 5° or less by the lens element.

The lens element is not particularly limited, and various optical elements that can collect diffused light to be approximated to parallel light. Specific examples of the lens element include a convex lens, a collimating lens, and a beam collimator.

The light emitted from the light source 12 is incident into and transmits through the liquid crystal hologram element 14.

The light transmitted through the liquid crystal hologram element 14 is diffracted in a plurality of different directions. The plurality of light components that travel in different directions are projected as a dot pattern (light dot pattern) that is an optical pattern formed by a plurality of light components (light beams).

(Liquid Crystal Hologram Element)

Figure 2:
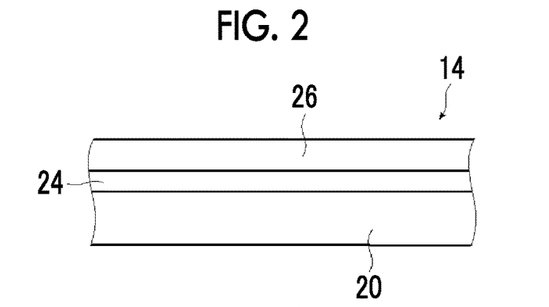
FIG. 2 is a diagram conceptually showing an example of a liquid crystal hologram element.

FIG. 2 conceptually shows an example of the liquid crystal hologram element 14. The liquid crystal hologram element 14 shown in FIG. 2 includes a support 20, an alignment film 24, and a liquid crystal hologram layer 26.

<<Support<<

The support 20 supports the alignment film 24 and the liquid crystal hologram layer 26.

The support 20 is not particularly limited and various well-known sheet-shaped materials (film or plate-shaped material) can be used as long as the alignment film 24 and the liquid crystal hologram layer 26 can be supported and sufficient transmittance is exhibited with respect to the light emitted from the light source 12.

Examples of the support 20 include a polyacrylic resin film such as polymethyl methacrylate, a cellulose resin film such as cellulose triacetate, a cycloolefin polymer film, a polyethylene terephthalate (PET) film, a polycarbonate film, and a resin film such as a polyvinyl chloride resin film. Examples of the cycloolefin polymer film include trade name "ARTON", manufactured by JSR Corporation and trade name "ZEONOR", manufactured by Zeon Corporation). The support 20 is not limited to a resin film and may be a glass substrate or the like.

In addition, the support 20 may be flexible or non-flexible.

The thickness of the support 20 is not particularly limited and may be appropriately set depending on a material for forming the support 20 and the like in a range where the alignment film 24 and the liquid crystal hologram layer 26 can be supported.

The thickness of the support 20 is preferably 1 to 2000 μm, more preferably 3 to 500 gm, and still more preferably 5 to 250 μm.

<<Alignment Film>>

In the liquid crystal hologram element 14, the alignment film 24 is formed on a surface of the support 20.

In a case where the liquid crystal hologram layer 26 of the liquid crystal hologram element 14 is formed, the alignment film 24 is an alignment film for aligning the liquid crystal compound to a desired alignment state.

Although described below, in the liquid crystal hologram element 14, the liquid crystal hologram layer 26 is formed of a composition including a liquid crystal compound and consists of a computer generated hologram. The liquid crystal hologram layer 26 consisting of the computer generated hologram is divided into a plurality of regions 26a, in which in the regions 26a, directions of optical axes derived from the liquid crystal compound are different from each other (refer to FIG. 3).

Accordingly, the alignment film 24 of the liquid crystal hologram element 14 is formed such that the liquid crystal hologram layer 26 is aligned to the liquid crystal alignment state.

As the alignment film 24, various well-known films can be used.

Examples of the alignment film include a rubbed film formed of an organic compound such as a polymer, an obliquely deposited film formed of an inorganic compound, a film having a microgroove, and a film formed by lamination of Langmuir-Blodgett (LB) films formed with a Langmuir-Blodgett's method using an organic compound such as ω-tricosanoic acid, dioctadecylmethylammonium chloride, or methyl stearate.

The alignment film formed by a rubbing treatment can be formed by rubbing a surface of a polymer layer with paper or fabric in a given direction multiple times.

As the material used for the alignment film, for example, a material for forming polyimide, polyvinyl alcohol, a polymer having a polymerizable group described in JP1997-152509A (JP-H9-152509A), or an alignment film such as JP2005-97377A, JP2005-99228A, and JP2005-128503A is preferable.

In the liquid crystal hologram element 14, for example, the alignment film 24 can be suitably used as a so-called photo-alignment film obtained by irradiating a photo-alignment material with polarized light or non-polarized light. That is, in the liquid crystal hologram element 14 according to the embodiment of the present invention, a photo-alignment film that is formed by applying a photo-alignment material to the support 20 is suitably used as the alignment film.

The irradiation of polarized light can be performed in a direction perpendicular or oblique to the photo-alignment film, and the irradiation of non-polarized light can be performed in a direction oblique to the photo-alignment film.

Preferable examples of the photo-alignment material used in the photo-alignment film that can be used in the present invention include: an azo compound described in JP2006-285197A, JP2007-076839A, JP2007-138138A, JP2007-094071A, JP2007-121721A, JP2007-140465A, JP2007-156439A, JP2007-133184A, JP2009-109831A, JP3883848B, and JP4151746B; an aromatic ester compound described in JP2002-229039A; a maleimide- and/or alkenyl-substituted nadiimide compound having a photo-alignment unit described in JP2002-265541A and JP2002-317013A; a photocrosslinking silane derivative described in JP4205195B and JP4205198B, a photocrosslinking polyimide, a photocrosslinking polyamide, or a photocrosslinking ester described in JP2003-520878A, JP2004-529220A, and JP4162850B; and a photodimerizable compound, in particular, a cinnamate compound, a chalcone compound, or a coumarin compound described in JP1997-118717A (JP-H9-118717A), JP1998-506420A (JP-H10-506420A), JP2003-505561A, WO2010/150748A, JP2013-177561A, and JP2014-012823A.

Among these, an azo compound, a photocrosslinking polyimide, a photocrosslinking polyamide, a photocrosslinking ester, a cinnamate compound, or a chalcone compound is suitably used.

The thickness of the alignment film 24 is not particularly limited. The thickness with which a required alignment function can be obtained may be appropriately set depending on the material for forming the alignment film 24.

The thickness of the alignment film 24 is preferably 0.01 to 5 μm and more preferably 0.05 to 2 μm.

A method of forming the alignment film 24 is not limited. Any one of various well-known methods corresponding to a material for forming the alignment film 24 can be used.

For example, the following method can be used. As described above, the liquid crystal hologram layer 26 is divided into a plurality of regions, in which in the regions, directions of optical axes derived from the liquid crystal compound are different from each other. First, a composition including a photo-alignment material is applied to the support 20 and dried to form a photo-alignment film. Laser light obtained by collecting linearly polarized light is emitted to the photo-alignment film to expose and align the photo-alignment film. By repeating the alignment by the exposure of the linearly polarized light while changing the polarization direction of the linearly polarized light depending on the formed computer generated hologram for one region or each of a plurality of regions, the entire alignment film 24 is aligned to a desired alignment state.

In the light irradiating device 10 according to the embodiment of the present invention, the support 20 and the alignment film 24 of the liquid crystal hologram element 14 are not essential configuration requirements.

For example, after forming the liquid crystal hologram layer 26, the support 20 may be peeled off such that the alignment film 24 and the liquid crystal hologram layer 26 form the liquid crystal hologram element 14. Alternatively, after forming the liquid crystal hologram layer 26, the support 20 and the alignment film 24 may be peeled off such that only the liquid crystal hologram layer 26 forms the liquid crystal hologram element 14.

Alternatively, after aligning the support 20 to a desired alignment state, for example, using a method of processing the support 20 with laser light or the like as described above, the liquid crystal hologram layer 26 may be formed on the support 20 such that the support 20 and the liquid crystal hologram layer 26 form the liquid crystal hologram element 14. That is, in this configuration, the support 20 functions as the alignment film.

<<Liquid Crystal Hologram Layer>>

In the liquid crystal hologram element 14, the liquid crystal hologram layer 26 is formed on a surface of the alignment film 24.

As described above, in the liquid crystal hologram element 14, the liquid crystal hologram layer 26 is formed of a composition including a liquid crystal compound and consists of a computer generated hologram. In addition, as conceptually shown in FIG. 3, the liquid crystal hologram layer 26 is divided into a plurality of regions 26a in a plane direction according to the computer generated hologram, in which in the regions 26a, directions of optical axes 30 derived from the liquid crystal compound are different from each other.

Figure 3:
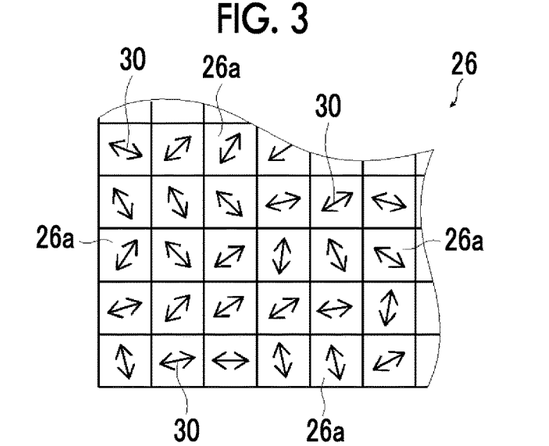
FIG. 3 is a diagram conceptually showing an example of the liquid crystal hologram layer.

The optical axis derived from the liquid crystal compound is an axis having the highest refractive index in the liquid crystal compound, that is, a so-called slow axis. For example, in a case where the liquid crystal compound is a rod-shaped liquid crystal compound, the optical axis is along a rod-shaped major axis direction.

In a case where light emitted from the light source 12 transmits through the liquid crystal hologram layer 26, the liquid crystal hologram layer 26 diffracts the light in a plurality of different directions. As a result, a plurality of light components (light beams) travel in different directions. Thus, as conceptually shown in FIG. 1, the light irradiating device 10 projects a dot pattern to an object, the dot pattern (light dot pattern) being an optical pattern that is formed by dots of the plurality of light components that travel in different directions.

The computer generated hologram (CGH) is formed by obtaining a given hologram having the above-described light diffraction function by calculation. In the present invention, the computer generated hologram is formed by two-dimensionally arranging the regions 26a (unit regions) of the liquid crystal hologram layer 26.

The liquid crystal hologram layer 26 is formed of a composition including a liquid crystal compound. That is, the liquid crystal hologram layer 26 is a space phase modulator using liquid crystal, and the plurality of regions 26a function as a liquid crystal diffraction element.

As described above, in a light irradiating device in the related art that projects a dot pattern, an optical system including a light source such as a VCSEL and a light guide where a lens and a reflecting surface are tilted at 45° and disposed parallel to each other is used. Therefore, the composition is complicated, and it is difficult to deal with reduction in thickness.

On the other hand, in the light irradiating device 10 according to the embodiment of the present invention, by using the liquid crystal hologram element 14 consisting of the computer generated hologram, a general laser light source or the like can be used as the light source instead of the dot light source such as VCSEL. In addition, in the light irradiating device 10 according to the embodiment of the present invention, by using the liquid crystal hologram element 14 consisting of the computer generated hologram, basically, an optical system including a lens and a reflective member is unnecessary, the structure is simple, and reduction in thickness can be realized.

A preparation method (calculation method) of the computer generated hologram is not particularly limited, and all of well-known methods such as a Gerchberg-Saxton iterative fourier transform algorithm (IFTA), a method using direct binary search (DBS), a method using genetic algorithm (GA), and a method using simulate dannealing (SA) can be used.

For example, the computer generated hologram (data of the computer generated hologram) may be prepared using a well-known method by inputting the dot pattern to be projected, the size of the regions 26a, and the like to a computer for forming the computer generated hologram in the liquid crystal hologram layer 26. For example, by exposing the alignment film 24 to linearly polarized light according to the computer generated hologram as described above, the liquid crystal hologram layer 26 consisting of the computer generated hologram can be prepared.

In the light irradiating device 10 according to the embodiment of the present invention, the size of the regions 26a of the liquid crystal hologram layer 26 is not particularly limited and is preferably as small as possible. Specifically, the size of the regions 26a is preferably 50 µm or less, more preferably 20 µm or less, and still more preferably 10 µm or less.

It is preferable that the size of the regions 26a is 50 µm or less from the viewpoint of suitably diffracting light emitted from the light source 12 in various directions such that an excellent dot pattern can be formed, an angle range at which the dot pattern can be projected can be increased, and the like.

The lower limit of the size of the regions 26a of the liquid crystal hologram layer 26 is not particularly limited and is preferably 0.1 µm or more from the viewpoint of, for example, easiness of preparation of the liquid crystal hologram element 14 (alignment film 24).

The shape of the regions 26a is not particularly limited and may be the same as that of unit regions of a well-known computer generated hologram such as a square shape, a rectangular shape, or a circular shape.

In a case where the regions 26a are square, the length of one side is set as the size of the regions. In a case where the regions 26a are rectangular, the length of a longer side is set as the size of the regions. In a case where the regions 26a are circular, the diameter of the circle is set as the size of the regions. Further, in a case where the shape of the regions 26a is a shape other than the above-described shapes, the diameter of a minimum circle inscribed in the regions 26a is set as the size of the regions.

The dot pattern that is projected from the light irradiating device 10 according to the embodiment of the present invention, that is, the liquid crystal hologram layer 26 is not particularly limited, and as in so-called structured light used for various authentication such as face authentication, various dot patterns (optical patterns) in which dots formed of light (light beams) are two-dimensionally arranged.

Accordingly, the density of the dots, the size of the dots, and the like are not particularly limited. Further, the dot pattern that is projected from the light irradiating device 10 according to the embodiment of the present invention may be ordered or disordered but is preferably disordered as in various structured light.

The liquid crystal hologram layer 26 is formed by curing a liquid crystal composition including a rod-shaped liquid crystal compound or a disk-shaped liquid crystal compound. The liquid crystal hologram layer 26 is divided into the plurality of regions 26a that are aligned such that directions of optical axes of the rod-shaped liquid crystal compounds or optical axes of the disk-shaped liquid crystal compounds are different from each other.

For example, by forming the alignment film 24 on the support 20, applying the liquid crystal composition to the alignment film 24, and curing the applied liquid crystal composition, the liquid crystal hologram layer 26 formed of the cured layer of the liquid crystal composition can be obtained.

In addition, the liquid crystal composition for forming the liquid crystal hologram layer 26 includes a rod-shaped liquid crystal compound or a disk-shaped liquid crystal compound and may further include other components such as a leveling agent, an alignment control agent, a polymerization initiator, or an alignment assistant.

—Rod-Shaped Liquid Crystal Compound—

As the rod-shaped liquid crystal compound, an azomethine compound, an azoxy compound, a cyanobiphenyl compound, a cyanophenyl ester compound, a benzoate compound, a phenyl cyclohexanecarboxylate compound, a cyanophenylcyclohexane compound, a cyano-substituted phenylpyrimidine compound, an alkoxy-substituted phenylpyrimidine compound, a phenyldioxane compound, a tolan compound, or an alkenylcyclohexylbenzonitrile compound is preferably used. As the rod-shaped liquid crystal compound, not only the above-described low molecular weight liquid crystal molecules but also high molecular weight liquid crystal molecules can be used.

It is preferable that the alignment of the rod-shaped liquid crystal compound is immobilized by polymerization. Examples of the polymerizable rod-shaped liquid crystal compound include compounds described in Makromol. Chem., (1989), Vol. 190, p. 2255, Advanced Materials (1993), Vol. 5, p. 107, U.S. Pat. Nos. 4,683,327A, 5,622,648A, 5,770,107A, WO95/022586A, WO95/024455A, WO97/000600A, WO98/023580A, WO98/052905A, JP1989-272551A (JP-H1-272551A), JP1994-016616A (JP-H6-016616A), JP1995-110469A (JP-H7-110469A), JP1999-080081A (JP-H11-080081A), and JP2001-328973A. Further, as the rod-shaped liquid crystal compound, for example, compounds described in JP1999-513019A (JP-H11-513019A) and JP2007-279688A can be preferably used.

—Disk-Shaped Liquid Crystal Compound—

As the disk-shaped liquid crystal compound, for example, compounds described in JP2007-108732A and JP2010-244038A can be preferably used.

In a case where the disk-shaped liquid crystal compound is used in the optically-anisotropic layer, the liquid crystal compound rises in the thickness direction in the optically-anisotropic layer, and the optical axis derived from the liquid crystal compound is defined as an axis perpendicular to a disk surface, that is so-called, a fast axis.

In the liquid crystal hologram element 14, it is preferable that the value of an in-plane retardation of the liquid crystal hologram layer 26 is a half wavelength. In particular, it is preferable that an in-plane retardation $Re(\lambda)=\Delta n_\lambda \times d$ of the liquid crystal hologram layer 26 with respect to the incidence light having a wavelength of λ nm is in a range defined by the following Expression (1). Here, $\lambda n_\lambda$ represents a difference in refractive index generated by refractive index anisotropy of the region R in a case where the wavelength of incidence light is λ nm, and d represents the thickness of the liquid crystal hologram layer 26.

$$0.7 \times (\lambda/2) \text{ nm} \le \Delta n_\lambda \times d \le 1.3 \times (\lambda/2) \text{ nm} \quad (1)$$

That is, as long as the in-plane retardation $Re(\lambda)=\Delta n_\lambda \times d$ of the liquid crystal hologram layer 26 satisfies Expression (1), 0-order light of light incident into the liquid crystal hologram layer 26 can be reduced.

It is more preferable that the in-plane retardation $Re(\lambda)=\lambda n_\lambda \times d$ satisfies $0.8 \times (\lambda/2) \text{ nm} \le \lambda n_\lambda \times d \le 1.2 \times (\lambda/2)$ nm, and it is still more preferable that the in-plane retardation $Re(\lambda)=\lambda n_\lambda \times d$ satisfies $0.9 \times (\lambda/2) \text{ nm} \le \lambda n_\lambda \times d \le 1.1 \times (\lambda/2)$ nm.

(Diffractive Optical Element)

Figure 4:
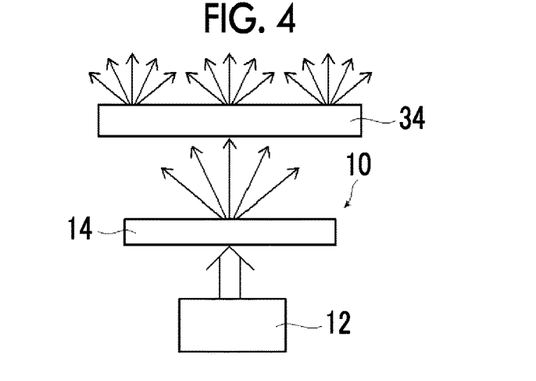
FIG. 4 is a diagram conceptually showing another example of the light irradiating device according to the present invention.

In the light irradiating device according to the embodiment of the present invention, as conceptually shown in FIG. 4, a diffractive optical element 34 may be provided downstream of the liquid crystal hologram element 14 in a light traveling direction. In the present invention, the upstream and the downstream refer to the upstream and the downstream in the light traveling direction.

The diffractive optical element 34 duplicates a dot pattern formed of a plurality of light components having different emission directions that are emitted from the light source 12 and transmitted through the liquid crystal hologram element 14, and projects the duplicated dot patterns to a wider angle region. In other words, the diffractive optical element 34 can divide one light (light beam) in the dot pattern formed of the plurality of light components emitted from the liquid crystal hologram element 14, to duplicate and arrange the dot pattern, and can project the duplicated dot patterns to a wider angle region.

The duplication projection of the optical pattern such as the dot pattern can be widely used as three-dimensional optical mapping.

With this three-dimensional optical mapping, the three-dimensional shape of a surface of one object is generated by processing an optical image thereof. Desired characteristics of the projected optical pattern generally depend on applications and typically include high contrast, high projection efficiency, and high uniformity in an intensity distribution between luminous fluxes forming the optical pattern.

In a case where the uniformity in the intensity distribution of projection light is low, the accuracy of the processing of the dot pattern (optical image) decreases, and thus it is desirable to increase the uniformity. For this reason, in general, the diffractive optical element is widely used for the three-dimensional optical mapping.

However, the diffractive optical element has a problem of 0-order beams. The 0-order beams are beams that are a part of incidence light, are not diffracted by projection, and transmit through an optical system (diffractive optical element) to reach a projection space, and the intensity thereof is high.

In order to reduce the influence of the 0-order beams, for example, U.S. Pat. No. 6,560,019B describes a diffractive optical element including first and second lattices. In addition, US2007/0019909A describes a diffractive optical element and an image display apparatus having a first surface that is provided at a position where 0-order beams output from the diffractive optical element are not incident. Further, JP2014-209237A a method of dispersing the intensity of 0-order beams using a plurality of diffraction elements to obtain high uniformity in the intensity distribution. In addition, improvement of the method of projecting the optical pattern is required.

In the light irradiating device 10 according to the embodiment of the present invention, it is preferable that the diffractive optical element 34 is formed using a liquid crystal diffraction element. By forming the diffractive optical element 34 using the liquid crystal diffraction element, the intensity of 0-order beams and ±1-order beams can be controlled, and high uniformity in the intensity distribution of light can be obtained.

The liquid crystal diffraction element includes an optically-anisotropic layer that is formed of a liquid crystal composition including a liquid crystal compound. In addition, it is preferable that the optically-anisotropic layer has a liquid crystal alignment pattern in which a direction of an optical axis derived from the liquid crystal compound changes while continuously rotating in at least one in-plane direction.

Figure 5:
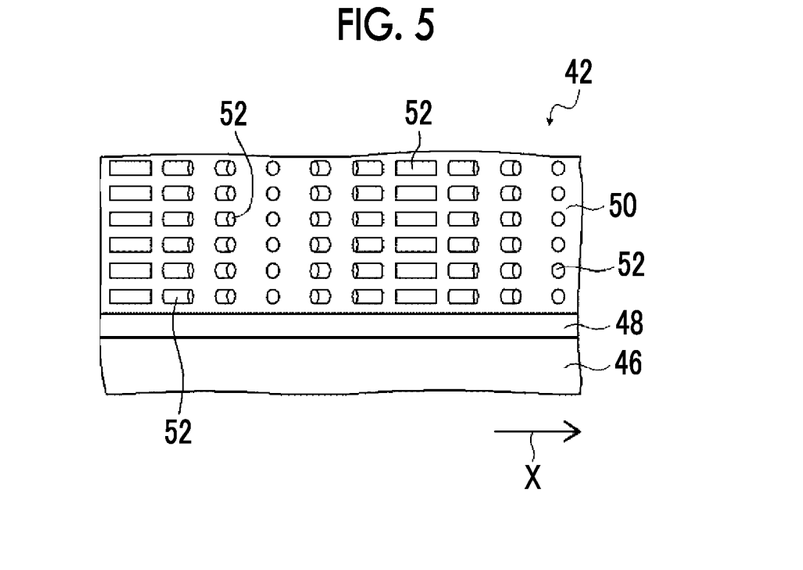
FIG. 5 is a diagram conceptually showing an example of the liquid crystal diffraction element.

FIG. 5 conceptually shows an example of the liquid crystal diffraction element.

As shown in FIG. 5, the liquid crystal diffraction element 42 includes a support 46, an alignment film 48, and an optically-anisotropic layer 50.

As the support 46, various sheet-shaped materials (films or plate-shaped materials) can be used as long as they can support the alignment film 24 and the optically-anisotropic layer 50. As the support 46, a transparent support is preferable, and the same support as the above-described support 20 can be used.

In the liquid crystal diffraction element 42, the alignment film 48 is formed on a surface of the support 46.

The alignment film 24 is an alignment film for aligning a liquid crystal compound 52 to the predetermined liquid crystal alignment pattern during the formation of the optically-anisotropic layer 50 of the liquid crystal diffraction element 42.

Although described below, in the liquid crystal diffraction element 42 according to the embodiment of the present invention, the optically-anisotropic layer 50 has a liquid crystal alignment pattern in which a direction of an optical axis 52A (refer to FIG. 6) derived from the liquid crystal compound 52 changes while continuously rotating in one in-plane direction (arrow X direction described below). Accordingly, the alignment film 48 of the liquid crystal diffraction element 42 is formed such that the optically-anisotropic layer 50 can form the liquid crystal alignment pattern.

As the alignment film 48, the same alignment film as the above-described alignment film 24 can be used.

In particular, a so-called photo-alignment film obtained by irradiating a photo-alignment material with polarized light or non-polarized light can be suitably used. That is, in the liquid crystal diffraction element 42, a photo-alignment film that is formed by applying a photo-alignment material to the support 46 is suitably used as the alignment film.

A method of forming the alignment film is not limited. Any one of various well-known methods corresponding to a material for forming the alignment film can be used. For example, a method including: applying the alignment film to a surface of the support 20; drying the applied alignment film; and exposing the alignment film to laser light to form an alignment pattern can be used.

The liquid crystal diffraction element 42 does not need to include the alignment film 48.

For example, the following configuration can also be adopted, in which, by forming the alignment pattern on the support 46 using a method of rubbing the support 46, a method of processing the support 46 with laser light or the like, or the like, the optically-anisotropic layer 50 or the like as the liquid crystal alignment pattern in which the direction of the optical axis 52A derived from the liquid crystal compound 52 changes while continuously rotating in at least one in-plane direction.

In the liquid crystal diffraction element 42, the optically-anisotropic layer 50 is formed on a surface of the alignment film 48.

The optically-anisotropic layer 50 is formed of a composition including a liquid crystal compound. In a case where an in-plane retardation value is set as $\lambda/2$, the optically-anisotropic layer 50 has a function of a general $\lambda/2$ plate, that is, a function of imparting a phase difference of a half wavelength, that is, 180° to two linearly polarized light components in light incident into the optically-anisotropic layer and are perpendicular to each other.

The optically-anisotropiclayer 50 has the liquid crystal alignment pattern in which the direction of the optical axis 52A derived from the liquid crystal compound 52 changes while continuously rotating in the one in-plane direction indicated by arrow X in a plane of the optically-anisotropic layer. In the optically-anisotropic layer 50, the direction of the liquid crystal compound 52 (optical axis 52A) matches the thickness direction (refer to FIG. 5).

In the following description, "one in-plane direction indicated by arrow X" will also be simply referred to as "arrow X direction". In addition, in the following description, the optical axis 52A derived from the liquid crystal compound 52 will also be referred to as "the optical axis 52A of the liquid crystal compound 52" or "the optical axis 52A".

Figure 7:
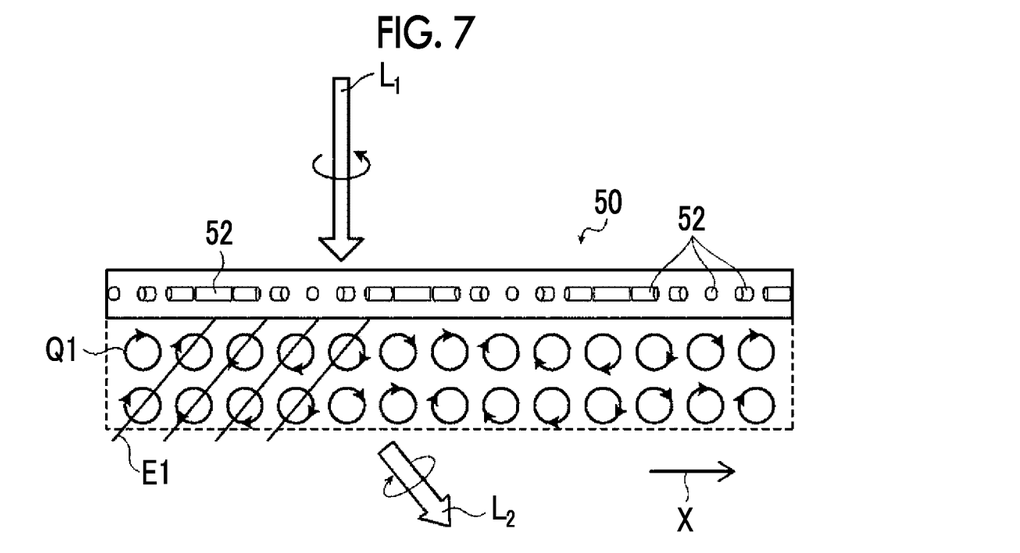
FIG. 7 is a conceptual diagram showing an effect of the optically-anisotropic layer.
Figure 8:
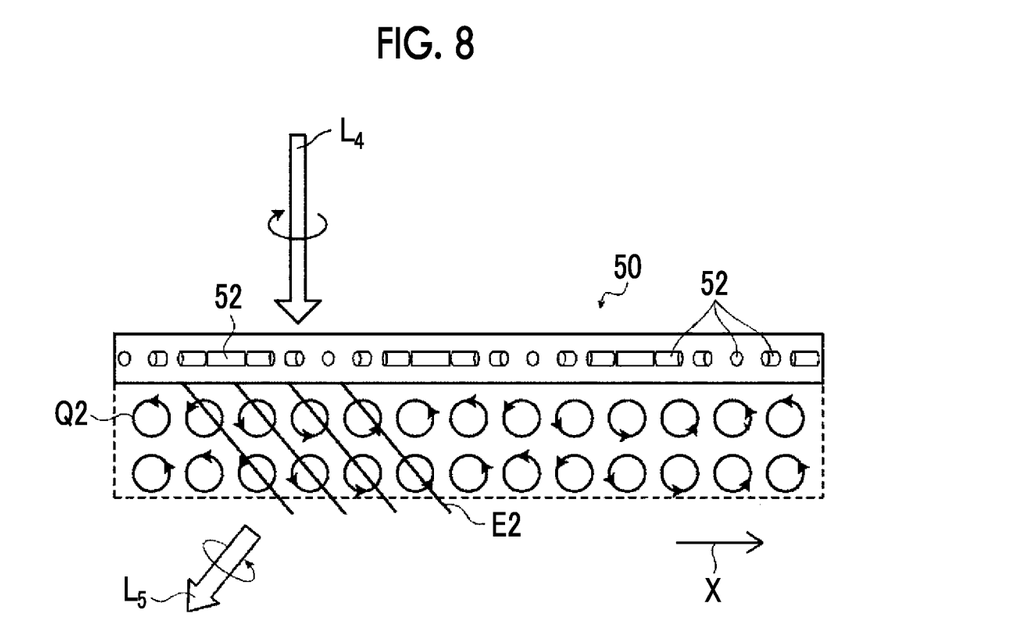
FIG. 8 is a conceptual diagram showing an effect of the optically-anisotropic layer.

In the optically-anisotropic layer 50, the liquid crystal compound 52 is two-dimensionally arranged in a plane parallel to the arrow X direction and a Y direction perpendicular to the arrow X direction. In FIGS. 5, 7, and 8 described below, the Y direction is a direction perpendicular to the plane.

Figure 6:
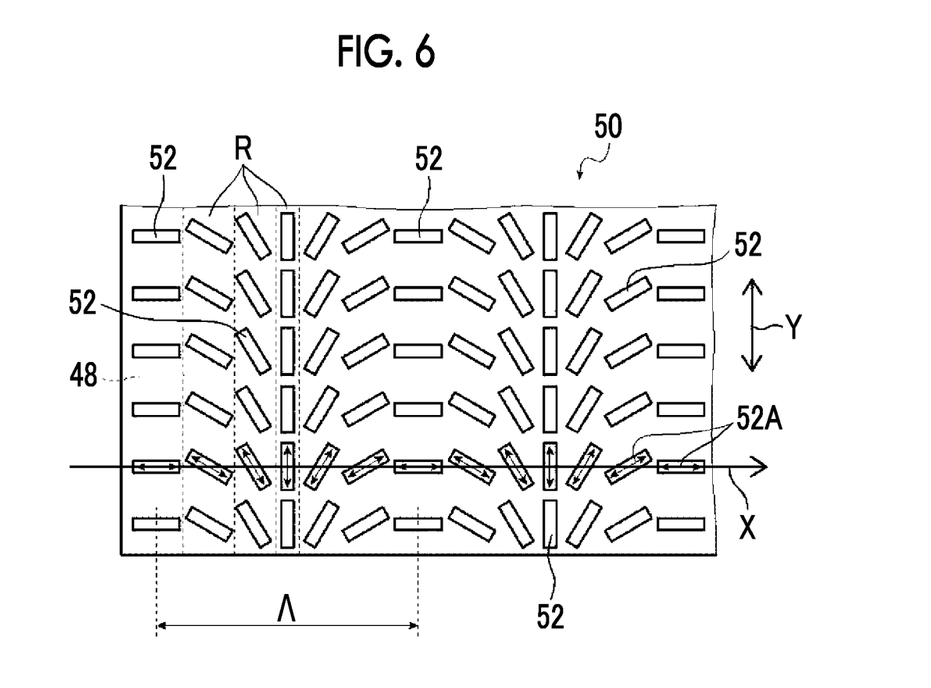
FIG. 6 is a schematic plan view showing an optically-anisotropic layer of the liquid crystal diffraction element shown in FIG. 5.

FIG. 6 conceptually shows a plan view of the optically-anisotropic layer 50.

The plan view is a view in a case where the liquid crystal diffraction element 42 is seen from the top in FIG. 5, that is, a view in a case where the liquid crystal diffraction element 42 is seen from a thickness direction (laminating direction of the respective layers (films)). In other words, the plan view is a view in a case where the optically-anisotropiclayer 50 is seen from a direction perpendicular to a main surface.

In addition, in FIG. 6, in order to clarify the configuration of the liquid crystal diffraction element 42 according to the embodiment of the present invention, only the liquid crystal compound 52 on the surface of the alignment film 24 is shown. However, in the thickness direction, as shown in FIG. 5, the optically-anisotropiclayer 50 has the structure in which the liquid crystal compound 52 on the surface of the alignment film 24 is laminated.

The optically-anisotropiclayer 50 has the liquid crystal alignment pattern in which the direction of the optical axis 52A derived from the liquid crystal compound 52 changes while continuously rotating in the arrow X direction in a plane.

Specifically, "the direction of the optical axis 52A of the liquid crystal compound 52 changes while continuously rotating in the arrow X direction (the predetermined one in-plane direction)" represents that an angle between the optical axis 52A of the liquid crystal compound 52, which is arranged in the arrow X direction, and the arrow X direction varies depending on positions in the arrow X direction, and the angle between the optical axis 52A and the arrow X direction sequentially changes from θ to θ+180° or θ−180° in the arrow X direction.

On the other hand, in a state where the direction of the optical axis 52A is uniform, the liquid crystal compounds 52 forming the optically-anisotropiclayer 50 are arranged at regular intervals in the Y direction perpendicular to the arrow X direction, that is, the Y direction perpendicular to the one in-plane direction in which the optical axis 52A continuously rotates.

In other words, regarding the liquid crystal compound 52 forming the optically-anisotropic layer 50, in the liquid crystal compounds 52 arranged in the Y direction, angles between the directions of the optical axes 52A and the arrow X direction are the same.

In the liquid crystal alignment pattern of the liquid crystal compound 52 of the optically-anisotropic layer 50, the length (distance) over which the optical axis 52A of the liquid crystal compound 52 rotates by 180° in the arrow X direction in which the direction of the optical axis 52A changes while continuously rotating in a plane is the length Λ of the single period in the liquid crystal alignment pattern. In the following description, the length Λ of the single period will also be referred to as "single period Λ". In other words, the single period Λ in the liquid crystal alignment pattern is defined as the distance between θ and θ+180° that is a range of the angle between the optical axis 52A of the liquid crystal compound 52 and the arrow X direction.

That is, a distance between centers of two liquid crystal compounds 52 in the arrow X direction is the single period Λ, the two liquid crystal compounds having the same angle in the arrow X direction. Specifically, as shown in FIG. 6, a distance of centers in the arrow X direction of two liquid crystal compounds 52 in which the arrow X direction and the direction of the optical axis 52A match each other is the single period Λ.

In the liquid crystal diffraction element 42, in the liquid crystal alignment pattern of the optically-anisotropic layer, the single period Λ is repeated in the arrow X direction, that is, in the one in-plane direction in which the direction of the optical axis 52A changes while continuously rotating.

As described above, in the liquid crystal compounds arranged in the Y direction in the optically-anisotropic layer 50, the angles between the optical axes 52A and the arrow X direction (the one in-plane direction in which the direction of the optical axis of the liquid crystal compound 52 rotates) are the same. Regions where the liquid crystal compounds 52 in which the angles between the optical axes 52A and the arrow X direction are the same are disposed in the Y direction will be referred to as "regions R".

In this case, it is preferable that an in-plane retardation (Re) value of each of the regions R is appropriately set as necessary, for example, a half wavelength, that is, λ/2 or a ¼ wavelength, that is, λ/4. The in-plane retardation is calculated from the product of a difference Δn in refractive index generated by refractive index anisotropy of the region R and the thickness of the optically-anisotropic layer. Here, the difference in refractive index generated by refractive index anisotropy of the region R in the optically-anisotropic layer is defined by a difference between a refractive index of a direction of an in-plane slow axis of the region R and a refractive index of a direction perpendicular to the direction of the slow axis. That is, the difference Δn in refractive index generated by refractive index anisotropy of the region R is the same as a difference between a refractive index of the liquid crystal compound 52 in the direction of the optical axis 52A and a refractive index of the liquid crystal compound 52 in a direction perpendicular to the optical axis 52A in a plane of the region R. That is, the difference Δn in refractive index is the same as the difference in refractive index of the liquid crystal compound.

In a case where circularly polarized light is incident into the above-described optically-anisotropic layer 50, the light is refracted such that the direction of the circularly polarized light is converted.

This action is conceptually shown in FIG. 7. In the optically-anisotropic layer 50, the value of the product of the difference in refractive index of the liquid crystal compound and the thickness of the optically-anisotropic layer is λ/2.

In FIG. 7 and FIG. 8 described below, in order to simplify the drawing and to clarify the configuration of the liquid crystal diffraction element 42, only the liquid crystal compound 52 (liquid crystal compound molecules) on the surface of the alignment film in the optically-anisotropiclayer 50 is shown. However, as conceptually shown in FIG. 5, the first optically-anisotropiclayer 50 has a structure in which the aligned liquid crystal compounds 52 are laminated in the thickness direction as in an optically-anisotropic layer that is formed using a composition including a typical liquid crystal compound.

As shown in FIG. 7, in a case where the value of the product of the difference in refractive index of the liquid crystal compound 52 in the optically-anisotropiclayer 50 and the thickness of the optically-anisotropiclayer 50 is λ/2 and incidence light $L_1$ as left circularly polarized light is incident into the optically-anisotropic layer 50, the incidence light $L_1$ transmits through the optically-anisotropiclayer 50 to be imparted with a phase difference of 180°, and the transmitted light $L_2$ is converted into right circularly polarized light.

In addition, in a case where the incidence light $L_1$ transmits through the optically-anisotropic layer 50, an absolute phase thereof changes depending on the direction of the optical axis 52A of each of the liquid crystal compounds 52. In this case, the direction of the optical axis 52A changes while rotating in the arrow X direction. Therefore, the amount of change in the absolute phase of the incidence light $L_1$ varies depending on the direction of the optical axis 52A. Further, the liquid crystal alignment pattern that is formed in the optically-anisotropiclayer 50 is a pattern that is periodic in the arrow X direction. Therefore, as shown in FIG. 7, the incidence light $L_1$ transmitted through the optically-anisotropiclayer 50 is imparted with an absolute phase Q1 that is periodic in the arrow X direction corresponding to the direction of each of the optical axes 52A. As a result, an equiphase surface E1 that is tilted in a direction opposite to the arrow X direction is formed.

Therefore, the transmitted light $L_2$ is refracted to be tilted in a direction perpendicular to the equiphase surface E10 and travels in a direction different from a traveling direction of the incidence light $L_1$. This way, the incidence light $L_1$ of the left circularly polarized light is converted into the transmitted light $L_2$ of right circularly polarized light that is tilted by a predetermined angle in the arrow X direction with respect to an incidence direction.

On the other hand, as conceptually shown in FIG. 8, in a case where the value of the product of the difference in refractive index of the liquid crystal compound in the optically-anisotropiclayer 50 and the thickness of the optically-anisotropiclayer 50 is λ/2 and incidence light $L_4$ as right circularly polarized light is incident into the optically-anisotropic layer 50, the incidence light $L_4$ transmits through the optically-anisotropiclayer 50 to be imparted with a phase difference of 180° and is converted into transmitted light $L_5$ of left circularly polarized light.

In addition, in a case where the incidence light $L_4$ transmits through the optically-anisotropic layer 50, an absolute phase thereof changes depending on the direction of the optical axis 52A of each of the liquid crystal compounds 52. In this case, the direction of the optical axis 52A changes while rotating in the arrow X direction. Therefore, the amount of change in the absolute phase of the incidence light $L_4$ varies depending on the direction of the optical axis 52A. Further, the liquid crystal alignment pattern that is formed in the optically-anisotropiclayer 50 is a pattern that is periodic in the arrow X direction. Therefore, as shown in FIG. 8, the incidence light $L_4$ transmitted through the optically-anisotropiclayer 50 is imparted with an absolute phase Q2 that is periodic in the arrow X direction corresponding to the direction of each of the optical axes 52A.

Here, the incidence light $L_4$ is right circularly polarized light. Therefore, the absolute phase Q2 that is periodic in the arrow X direction corresponding to the direction of the optical axis 52A is opposite to the incidence light $L_1$ as left circularly polarized light. As a result, in the incidence light $L_4$, an equiphase surface E2 that is tilted in the arrow X direction opposite to that of the incidence light $L_1$ is formed.

Therefore, the incidence light $L_4$ is refracted to be tilted in a direction perpendicular to the equiphase surface E2 and travels in a direction different from a traveling direction of the incidence light $L_4$. This way, the incidence light $L_4$ is converted into the transmitted light $L_5$ of left circularly polarized light that is tilted by a predetermined angle in a direction opposite to the arrow X direction with respect to an incidence direction.

As the above-described single period $\wedge$ decreases, the size of tilt in an emission direction with respect to a light incidence direction increases.

The optically-anisotropiclayer 50 is formed by curing a liquid crystal composition including a rod-shaped liquid crystal compound or a disk-shaped liquid crystal compound, and has a liquid crystal alignment pattern in which an optical axis of the rod-shaped liquid crystal compound or an optical axis of the disk-shaped liquid crystal compound is aligned as described above.

By forming the alignment film 48 on the support 46, applying the liquid crystal composition to the alignment film 48, and curing the applied liquid crystal composition, the optically-anisotropiclayer 50 formed of the cured layer of the liquid crystal composition can be obtained. Although the optically-anisotropiclayer 50 functions as a so-called λ/2 plate, the present invention also includes an aspect where a laminate including the support 46 and the alignment film 48 that are integrated functions as a so-called λ/2 plate.

In addition, the liquid crystal composition for forming the optically-anisotropic layer 50 includes a rod-shaped liquid crystal compound or a disk-shaped liquid crystal compound and may further include other components such as a leveling agent, an alignment control agent, a polymerization initiator, or an alignment assistant.

As materials of these components, the same materials as those of the above-described liquid crystal hologram layer 26 can be used.

In the liquid crystal diffraction element 42, the thickness of the optically-anisotropic layer 50 is not particularly limited and, from the viewpoint of reducing the thickness of a light irradiating device 10, is preferably 20 μm or less, more preferably 15 μm or less, still more preferably 10 μm or less, and still more preferably 5 μm or less.

In the liquid crystal diffraction element 42 shown in FIGS. 5 to 8, the optical axis 52A of the liquid crystal compound 52 in the liquid crystal alignment pattern of the optically-anisotropiclayer 50 continuously rotates only in the arrow X direction.

However, the liquid crystal diffraction element used in the present invention is not limited thereto, and various configurations can be used as long as the optical axis 52A of the liquid crystal compound 52 in the optically-anisotropic layer continuously rotates in at least one in-plane direction.

Figure 9:
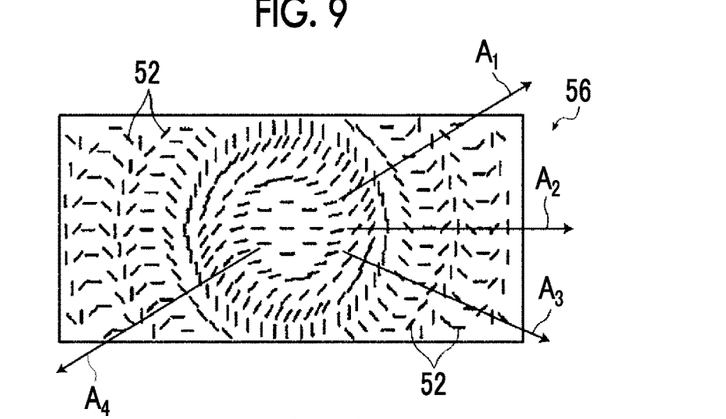
FIG. 9 is a schematic plan view showing another example of the optically-anisotropic layer.

In a preferable example, as conceptually shown in a plan view of FIG. 9, an optically-anisotropic layer 56 having the liquid crystal alignment pattern can be used. The liquid crystal alignment pattern in the optically-anisotropic layer 56 shown in FIG. 9 is a concentric circular pattern having a concentric circular shape where the one in-plane direction in which the direction of the optical axis of the liquid crystal compound 52 changes while continuously rotating moves from an inside toward an outside.

In other words, the liquid crystal alignment pattern of the optically-anisotropic layer 56 shown in FIG. 9 is a liquid crystal alignment pattern where the one in-plane direction in which the direction of the optical axis of the liquid crystal compound 52 changes while continuously rotating is provided in a radial shape from the center of the optically-anisotropic layer 56.

FIG. 9 shows only the liquid crystal compound 52 of the surface of the alignment film as in FIG. 6. However, as shown in FIG. 5, the optically-anisotropic layer 56 has the structure in which the liquid crystal compound 52 on the surface of the alignment film is laminated as described above.

In addition, FIG. 9 shows only the liquid crystal compound 52 in order to simplify the drawing. In the example shown in FIG. 9, the liquid crystal compound 52 is a rod-shaped liquid crystal compound, and the direction of the optical axis matches a longitudinal direction of the liquid crystal compound 52.

In the optically-anisotropic layer 56, the direction of the optical axis of the liquid crystal compound 52 changes while continuously rotating in a direction in which a large number of optical axes move to the outside from the center of the optically-anisotropic layer 56, for example, a direction indicated by an arrow $A_1$, a direction indicated by an arrow $A_2$, a direction indicated by an arrow $A_3$, a direction indicated by an arrow $A_4$, or . . . .

In circularly polarized light incident into the optically-anisotropic layer 56 having the above-described liquid crystal alignment pattern, the absolute phase changes depending on individual local regions having different directions of optical axes of the liquid crystal compound 52. In this case, the amount of change in absolute phase varies depending on the directions of the optical axes of the liquid crystal compound 52 into which circularly polarized light is incident.

In the optically-anisotropic layer 56, the rotation direction of the optical axis of the liquid crystal compound 52 is the same as all the directions (one in-plane direction). In the example shown in the drawing, in all the directions including the direction indicated by the arrow $A_1$, the direction indicated by the arrow $A_2$, the direction indicated by the arrow $A_3$, and the direction indicated by the arrow $A_4$, the rotation direction of the optical axis of the liquid crystal compound 52 is counterclockwise.

That is, in a case where the arrow $A_1$ and the arrow $A_4$ is assumed as one straight line, the rotation direction of the optical axis of the liquid crystal compound 52 at the center of the optically-anisotropic layer 56 is reversed. For example, the straight line formed by the arrow $A_1$ and the arrow $A_4$ is directed in the right direction (arrow $A_1$ direction) in the drawing. In this case, the optical axis of the liquid crystal compound 52 rotates clockwise to the center from the outer direction of the optically-anisotropic layer 56, the rotation direction is reversed at the center of the optically-anisotropic layer 56, and then the optical axis of the liquid crystal compound 52 rotates counterclockwise from the center of the optically-anisotropic layer 56 to the outer direction thereof.

As described above, in the optically-anisotropic layer (liquid crystal optical element) having the liquid crystal alignment pattern in which the direction of the optical axis of the liquid crystal compound 52 changes while continuously rotating in the one in-plane direction, a refraction direction of transmitted light depends on the rotation direction of the optical axis of the liquid crystal compound 52. That is, in this liquid crystal alignment pattern, in a case where the rotation direction of the optical axis of the liquid crystal compound 52 is reversed, the refraction direction of transmitted light is also reversed with respect to the one in-plane direction in which the optical axis rotates.

Accordingly, in the optically-anisotropic layer 56 having the concentric circular liquid crystal alignment pattern, that is, the liquid crystal alignment pattern in which the optical axis changes while continuously rotating in a radial shape, transmission of a plurality of incidence light components (light beams) can be dispersed or converged depending on the rotation direction of the optical axis of the liquid crystal compound 52 and the turning direction of circularly polarized light to be incident.

That is, by setting the liquid crystal alignment pattern of the optically-anisotropic layer in a concentric circular shape, the liquid crystal diffraction element 42 exhibits, for example, a function as a convex lens or a concave lens.

In the light irradiating device according to the embodiment of the present invention, by forming the diffractive optical element 34 using the liquid crystal diffraction element, the intensity of 0-order beams and ±1-order beams can be controlled as described above, and high uniformity in the intensity distribution can be obtained.

In addition, by laminating liquid crystal diffraction elements having different single periods $\wedge$, the angle of ±1-order beams can be controlled. Therefore, a wide space can be efficiently covered with light having a uniform intensity such that duplicated and projected patterns do not overlap each other. As described above, the single period $\wedge$ refers to the length of the single period over which the optical axis derived from the liquid crystal compound rotates by 180° in the liquid crystal alignment pattern.

The liquid crystal diffraction elements may be laminated such that the one in-plane directions (the arrow X directions in FIGS. 5 to 8) in which the optical axes derived from the liquid crystal compound are parallel to each other, are perpendicular to each other, or obliquely intersect with each other. That is, in the light irradiating device according to the embodiment of the present invention, the diffractive optical element 34 may include a plurality of diffraction elements having different diffraction directions.

With a combination of these configurations, a wide region of a three-dimensional space can be covered with the optical pattern.

In addition, in the present invention, in a case where the diffractive optical element 34 includes the liquid crystal diffraction element, it is preferable that the diffractive optical element 34 includes a phase difference plate in addition to the liquid crystal diffraction element.

In a case where the diffractive optical element 34 includes a plurality of liquid crystal diffraction elements that overlap each other, it is preferable that the phase difference plate is provided between the liquid crystal diffraction elements. In a case where a plurality of liquid crystal diffraction elements are provided to overlap each other, it is preferable that a combination of one phase difference plate with one liquid crystal diffraction element is used.

The phase difference plate converts the state of the diffracted circularly polarized light into another polarization state. As a result, in a case where light transmitted through the phase difference plate is incident into the liquid crystal diffraction element on the downstream side, ±1-order beams can be made to have the same intensity.

The phase difference plate is not particularly limited and may be appropriately selected depending on the optical anisotropy of the liquid crystal diffraction element. An λ/4 plate is preferable. At this time, circularly polarized light is converted into linearly polarized light. Therefore, +1-order beams of liquid crystal diffracted light from linearly polarized light obtained by arranging left and right polarized light components to overlap each other can be made to overlap each other, and the intensity of light can be made uniform.

As described above, the liquid crystal diffraction element includes an optically-anisotropic layer. In the optically-anisotropic layer, as described above, the angle at which transmitted light is refracted can be controlled depending on the length of the single period $\wedge$ of the liquid crystal alignment pattern.

In addition, the optically-anisotropic layer has regions where the lengths of the single periods $\wedge$ of the liquid crystal alignment pattern are different from each other. As a result, the angle at which transmitted light is refracted changes in a plane.

In the light irradiating device 10 according to the embodiment of the present invention, the diffractive optical element 34 that divides light is not limited to the use of the liquid crystal diffraction element.

That is, in the present invention, as the diffractive optical element 34, various well-known diffractive optical elements (DOE) used for projecting the optical pattern such as the dot pattern, for example, a diffractive optical element by surface relief or a diffractive optical element by a diffraction hologram can be used. In addition, as the diffractive optical element 34, various commercially available products may be used.

(Polarization Switching Element)

The liquid crystal hologram element 14 (liquid crystal hologram layer 26) forming the light irradiating device 10 according to the embodiment of the present invention consists of the computer generated hologram and is divided into the plurality of regions 26a, in which in the regions 26a, directions of optical axes derived from the liquid crystal compound are different from each other. As described above, the liquid crystal hologram layer 26 of the liquid crystal hologram element 14 functions as a space phase modulator.

In a case where unpolarized light or linearly polarized light is incident into the liquid crystal hologram element 14, transmitted light is converted into right circularly polarized light or left circularly polarized light depending on the directions of the optical axes 30 in the regions 26a of the liquid crystal hologram layer 26 into which the light is incident. In addition, in a case where right circularly polarized light is incident into the liquid crystal hologram element 14, the transmitted light is converted into left circularly polarized light. In a case where left circularly polarized light is incident into the liquid crystal hologram element 14, the transmitted light is converted into right circularly polarized light.

In the light irradiating device according to the embodiment of the present invention, using the above-described configuration, the polarization switching element may be disposed to switch the dot pattern to be projected, for example, in a time division manner.

By switching the dot pattern, for example, the detection accuracy can be improved in a case where the light irradiating device is used as various authentication devices such as a face authentication device.

Figure 10:
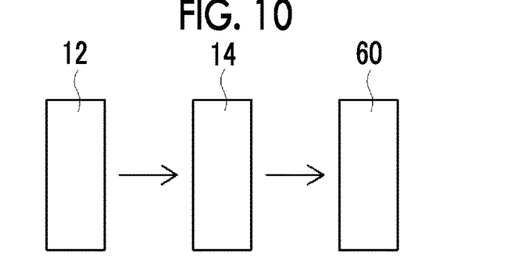
FIG. 10 is a diagram conceptually showing another example of the light irradiating device according to the present invention.

FIG. 10 conceptually shows an example of the configuration.

In the example shown in FIG. 10, a polarization switching element 60 is disposed downstream of the liquid crystal hologram element 14. The polarization switching element 60 is an element that switches transmitted light to any one of transmission of all of the light components, transmission of only right circularly polarized light, or transmission of only left circularly polarized light.

As described above, in a case where linearly polarized light and unpolarized light are incident into the liquid crystal hologram element 14, the transmitted light is converted into right circularly polarized light or left circularly polarized light. Accordingly, in a case where the polarization switching element 60 is in the state of transmission of only right circularly polarized light, a dot pattern of right circularly polarized light is projected. In a case where the polarization switching element 60 is in the state of transmission of only left circularly polarized light, a dot pattern of left circularly polarized light is projected. In a case where the polarization switching element 60 is in the state of transmission of all of the light components, a dot pattern of both right circularly polarized light and left circularly polarized light is projected.

Accordingly, by disposing the polarization switching element 60 downstream of the liquid crystal hologram element 14, the dot pattern to be projected is switched, for example, in a time division manner.

Figure 11:
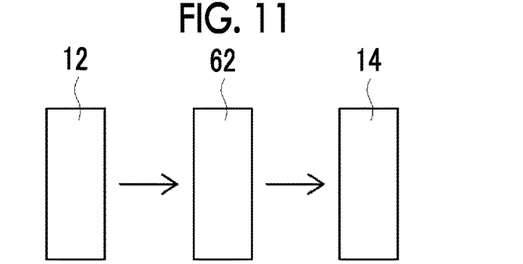
FIG. 11 is a diagram conceptually showing another example of the light irradiating device according to the present invention.

FIG. 11 shows another example of the light irradiating device according to the embodiment of the present invention including the polarization switching element.

In the example shown in FIG. 11, a polarization switching element 62 is disposed between the light source 12 and the liquid crystal hologram element 14.

In this configuration, it is preferable that the light source 12 emits linearly polarized light. In addition, in a case where the light source 12 emits unpolarized light, it is preferable that a polarizer is provided between the light source 12 and the polarization switching element 62.

The polarization switching element 62 switches polarized light of transmitted light to any one of linearly polarized light, right circularly polarized light, or left circularly polarized light. As described above, in a case where linearly polarized light is incident into the liquid crystal hologram element 14, the transmitted light is converted into right circularly polarized light or left circularly polarized light. In a case where right circularly polarized light is incident into the liquid crystal hologram element 14, the transmitted light is converted into left circularly polarized light. In a case where left circularly polarized light is incident into the liquid crystal hologram element 14, the transmitted light is converted into right circularly polarized light.

Therefore, in a case where the polarization switching element 62 converts incident linearly polarized light into right circularly polarized light, a dot pattern of left circularly polarized light is projected. In a case where the polarization switching element 62 converts incident linearly polarized light into left circularly polarized light, a dot pattern of right circularly polarized light is projected. In a case where the polarization switching element 62 allows transmission of linearly polarized light as it is, a dot pattern of right circularly polarized light and left circularly polarized light is projected.

Accordingly, in the configuration shown in FIG. 11, the dot pattern that is projected by the light irradiating device according to the embodiment of the present invention is switched, for example, in a time division manner.

The light irradiating device according to the embodiment of the present invention may be configured as one light irradiating device by arranging a plurality of the above-described light irradiating devices.

As a result, by expanding the dot pattern, the dot pattern can be projected to a wider region.

The polarization switching elements 60 and 62 are not particularly limited, and various optical elements that can exhibit the above-described effects can be used.

For example, a polarization switching element including a liquid crystal cell can be used, the polarization switching element including: two substrates that include an electrode; and a liquid crystal layer that is sealed between the two substrates. As the polarization switching element 60 that switches transmitted circularly polarized light as described above using a liquid crystal cell and the polarization switching element 62 that switches the polarization state of transmitted light as described above using a liquid crystal cell, various elements having well-known configurations can be used.

Examples of the polarization switching element 60 that switches transmitted circularly polarized light as described above using a liquid crystal cell include elements of types such as vertical alignment (VA), in plane switching (IPS), twisted nematic (TN), and electrically controlled birefringence (ECB).

Examples of the polarization switching element 62 that switches the polarization state of transmitted light as described above using a liquid crystal cell include elements of types such as vertical alignment (VA), in plane switching (IPS), twisted nematic (TN), and electrically controlled birefringence (ECB).

Figure 12:
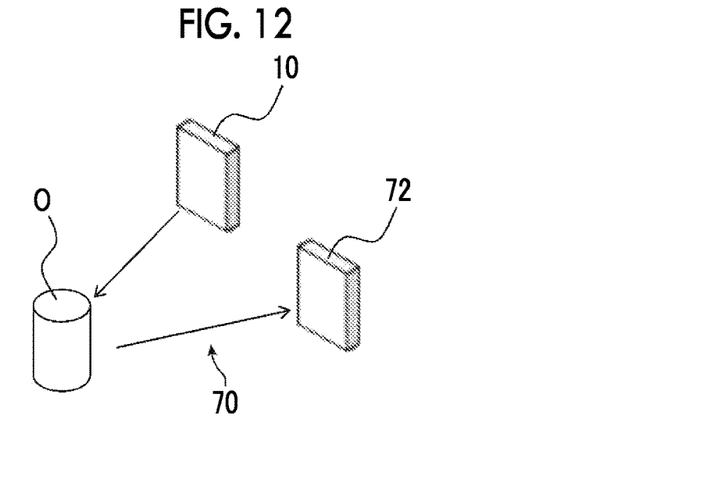
FIG. 12 is a diagram conceptually showing an example of a sensor according to the present invention.

FIG. 12 conceptually shows an example of a sensor according to the embodiment of the present invention including the light irradiating device 10 according to the embodiment of the present invention.

A sensor 70 shown in FIG. 12 includes: the light irradiating device 10 according to the embodiment of the present invention that emits the dot pattern; and a light-receiving element 72.

In the sensor 70 shown in FIG. 12, the dot pattern projected from the light irradiating device 10 is incident into an object O (measurement target), and the dot pattern reflected from the object O is incident into the light-receiving element 72.

For example, the sensor 70 authenticates the object O using a difference between the dot pattern emitted from the light irradiating device 10 and the dot pattern received by the light-receiving element 72.

As the light-receiving element 72, various well-known light-receiving elements (optical sensors) can be used. Examples of the light-receiving element include a complementary metal oxide semiconductor (CMOS) sensor and a charge-coupled device (CCD) sensor.

It is preferable that the light-receiving element 72 is an area sensor that two-dimensionally detects light.

Hereinabove, the light irradiating device and the sensor according to the embodiment of the present invention have been described in detail. However, the present invention is not limited to the above-described examples, and various improvements and modifications can be made within a range not departing from the scope of the present invention.

EXAMPLES

Hereinafter, the characteristics of the present invention will be described in detail using examples. Materials, chemicals, used amounts, material amounts, ratios, treatment details, treatment procedures, and the like shown in the following examples can be appropriately changed within a range not departing from the scope of the present invention. Accordingly, the scope of the present invention is not limited to the following specific examples.

Example 1

<Calculation of Computer Generated Hologram>

Using a method of iterative fourier transform algorithm (IFTA), a phase pattern for generating a disordered dot pattern was calculated.

As the region of the phase pattern, a region of 1000×1000 was used for the calculation.

<Preparation of Liquid Crystal Hologram>

(Formation of Alignment Film)

A glass substrate was used as the support. The following coating liquid for forming an alignment film was applied to the support by spin coating. The support on which the coating film of the coating liquid for forming an alignment film was formed was dried using a hot plate at 60° C. for 60 seconds. As a result, an alignment film was formed.

| Coating Liquid for Forming Alignment Film | |
|---|---|
| Material for photo-alignment | 1.00 part by mass |
| Water | 16.00 parts by mass |
| Butoxyethanol | 42.00 parts by mass |
| Propylene glycol monomethyl ether | 42.00 parts by mass |

Material for Photo-Alignment (Exposure of Alignment Film)

By irradiating the alignment film with focused laser light of linearly polarized light to expose the alignment film, an alignment film P-1 having an alignment pattern was formed.

During the exposure of the alignment film, a laser that emits laser light having a wavelength (325 nm) was used as the laser. By changing the polarization direction of the linearly polarized light depending on the phase pattern simulated by the computer generated hologram and repeating exposure to linearly polarized light while changing the exposure position, the entirety of the alignment film was exposed to enter a desired alignment state. The exposure of the alignment film was performed such that the size of the unit regions (the regions 26a in FIG. 3) was 1 µm and 1000×1000 (1.0×1.0 mm).

(Formation of Liquid Crystal Hologram Layer)

As the liquid crystal composition for forming the liquid crystal hologram layer, the following composition A-1 was prepared.

| Composition A-1 | |
|---|---|
| Rod-shaped liquid crystal compound L-1 | 100.00 parts by mass |
| Polymerization initiator (IRGACURE (registered trade name) 907, manufactured by BASF SE) | 3.00 parts by mass |
| Photosensitizer (KAYACURE DETX-S, manufactured by Nippon Kayaku Co., Ltd.) | 1.00 part by mass |
| Leveling agent T-1 | 0.08 parts by mass |
| Methyl ethyl ketone | 2700.00 parts by mass |

Rod-shaped liquid crystal compound L-1

Leveling Agent T-1

The liquid crystal hologram layer was formed by applying multiple layers of the composition A-1 to the alignment film P-1. The application of the multiple layers refers to repetition of the following processes including: preparing a first liquid crystal immobilized layer by applying the first layer-forming composition A-1 to the alignment film, heating the composition A-1, cooling the composition A-1, and irradiating the composition A-1 with ultraviolet light for curing; and preparing a second or subsequent liquid crystal immobilized layer by applying the second or subsequent layer-forming composition A-1 to the formed liquid crystal immobilized layer, heating the composition A-1, cooling the composition A-1, and irradiating the composition A-1 with ultraviolet light for curing as described above. Even in a case where the liquid crystal layer was formed by the application of the multiple layers such that the total thickness of the liquid crystal layer was large, the alignment direction of the alignment film was reflected from a lower surface of the liquid crystal layer to an upper surface thereof.

First, in order to form the first layer, the following composition A-1 was applied to the alignment film P-1, and the coating film was heated on a hot plate at 80° C. Next, at 80° C., the coating film was irradiated with ultraviolet light having a wavelength of 365 nm at an irradiation dose of 300 mJ/cm$^2$ using a high-pressure mercury lamp in a nitrogen atmosphere. As a result, the alignment of the liquid crystal compound was immobilized.

A retardation value of the cured layer of a liquid crystal composition A-1 was obtained by applying the liquid crystal composition A-1 a support with an alignment film for retardation measurement that was prepared separately, aligning the director of the liquid crystal compound to be parallel to the substrate, irradiating the liquid crystal compound with ultraviolet irradiation for immobilization to obtain a liquid crystal immobilized layer (cured layer), and measuring the retardation value of the liquid crystal immobilized layer. The retardation value at a desired wavelength was measured using Axoscan (manufactured by Axo metrix Inc.).

Finally, the retardation value Re (940) of the liquid crystal layer at a wavelength of 940 nm was 470 nm.

In a case where a cross-section of the liquid crystal layer was observed with a scanning electron microscope (SEM), the thickness of the liquid crystal layer was 2.9 μm.

(Preparation of Light Irradiating Device)

A laser light source emitting linearly polarized light having a center wavelength of 940 nm were prepared. The laser light source and the liquid crystal hologram element were disposed such that light is incident from the laser light source into a hologram formation position of the prepared liquid crystal hologram element. As a result, a light irradiating device was prepared.

(Evaluation)

The optical pattern projected from the prepared light irradiating device was evaluated. Using the light irradiating device, the optical pattern was projected to a screen disposed at a distance of 30 cm from the light irradiating device in the normal direction, and the projected image was evaluated using an infrared camera.

As the dot pattern projected from the light irradiating device according to Example 1, an intended optical pattern was observed with the computer generated hologram.

Example 2

<Polarization Switching Element: Preparation of Liquid Crystal Cell>

A pair of support substrates in which a homeotropic alignment film was formed on a transparent glass substrate including an indium tin oxide electrode (ITO electrode) were prepared and were disposed such that the ITO electrodes faced inward. By sealing a nematic liquid crystal layer between the transparent substrates including the ITO electrode and applying a predetermined voltage to each of the electrodes, a liquid crystal cell in which the alignment state of the nematic liquid crystal layer changed was prepared.

By causing laser light as linearly polarized light having a center wavelength of 940 nm to be incident into the front surface of the liquid crystal cell, voltages at which the transmitted light of the liquid crystal cell was converted into linearly polarized light, right circularly polarized light, and left circularly polarized light were obtained.

(Preparation of Light Irradiating Device)

A light irradiating device was prepared using the same method as that of Example 1, except that the liquid crystal cell was disposed between the laser light source and the liquid crystal hologram element. The liquid crystal cell and the liquid crystal hologram element were disposed such that light emitted from the laser light source was incident into the liquid crystal cell and the liquid crystal hologram element.

(Evaluation)

The optical pattern projected from the prepared light irradiating device was evaluated.

By adjusting the voltage of the liquid crystal cell, light of linearly polarized light, right circularly polarized light, or left circularly polarized light was emitted to the liquid crystal hologram. Depending on the polarization state of the incidence light, three different dot patterns were observed.

As can be seen from the above results, the effects of the present invention are obvious.

The sensor and the like can be suitably used for various applications where the optical pattern is projected.

EXPLANATION OF REFERENCES

10: light irradiating device
12: light source
14: liquid crystal hologram element
20, 46: support
24, 48: alignment film
26: liquid crystal hologram layer
26a: region
30, 52A: optical axis
34: diffractive optical element
42: liquid crystal diffraction element
50, 56: optically-anisotropic layer
52: liquid crystal compound
60, 62: polarization switching element
O: object

What is claimed is:

1. A light irradiating device comprising:
a light source; and
a liquid crystal hologram element,
wherein light that originates from the light source and is incident on the liquid crystal hologram element is diffracted by the liquid crystal hologram element in a plurality of different directions as the light passes therethrough,
the liquid crystal hologram element includes a liquid crystal hologram layer,
the liquid crystal hologram layer is a layer that consists of a computer generated hologram and is formed of a composition including a liquid crystal compound,
the liquid crystal hologram layer includes a plurality of regions in which directions of optical axes derived from the liquid crystal compound are different from each other,
the computer generated hologram is formed by two-dimensionally arranging the plurality of regions so that a dot pattern is projected to an object to be detected, and
the light irradiating device further comprises a polarization switching element provided between the light source and the liquid crystal hologram element, wherein the light from the light source is polarized and the polarization switching element switches a polarization state of the light emitted from the light source.

2. The light irradiating device according to claim 1, wherein respective sizes of the plurality of regions are each is 50 µm or less.

3. The light irradiating device according to claim 2, wherein the light source emits light having a spread angle of 5° or less.

4. The light irradiating device according to claim 2, wherein the light source emits unpolarized light, and
a polarizer is provided between the light source and the polarization switching element or the light source emits linearly polarized light.

5. The light irradiating device according to claim 2, wherein the polarization switching element includes a liquid crystal cell including two substrates that include an electrode and a liquid crystal layer that is sealed between the substrates.

6. The light irradiating device according to claim 2, further comprising
a lens element that collects light emitted from the light source.

7. The light irradiating device according to claim 2, further comprising
a diffractive optical element that is provided downstream of the liquid crystal hologram element in a light traveling direction.

8. A light irradiating device comprising:
a plurality of the light irradiating devices according to claim 2.

9. A sensor comprising:
the light irradiating device according to claim 2; and
a light-receiving element.

10. The light irradiating device according to claim 1, wherein the light source emits light having a spread angle of 5° or less.

11. The light irradiating device according to claim 1, wherein the light source emits unpolarized light, and
a polarizer is provided between the light source and the polarization switching element or the light source emits linearly polarized light.

12. The light irradiating device according to claim 1, wherein the polarization switching element includes a liquid crystal cell including two substrates that include an electrode and a liquid crystal layer that is sealed between the substrates.

13. The light irradiating device according to claim 1, further comprising
a lens element that collects light emitted from the light source.

14. The light irradiating device according to claim 1, further comprising
a diffractive optical element that is provided downstream of the liquid crystal hologram element in a light traveling direction.

15. A light irradiating device comprising:
a plurality of the light irradiating devices according to claim 1.

16. A sensor comprising:
the light irradiating device according to claim 1; and
a light-receiving element.

* * * * *